US008490164B2

(12) United States Patent
Takahashi et al.

(10) Patent No.: US 8,490,164 B2
(45) Date of Patent: Jul. 16, 2013

(54) USER AUTHENTICATION METHOD, USER AUTHENTICATING DEVICE AND PROGRAM PRODUCT

(75) Inventors: Toshinari Takahashi, Ota-ku (JP); Kentaro Umesawa, Kawasaki (JP); Shinji Yamanaka, Suginami-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 776 days.

(21) Appl. No.: 11/723,738

(22) Filed: Mar. 21, 2007

(65) Prior Publication Data

US 2008/0082817 A1 Apr. 3, 2008

(30) Foreign Application Priority Data

Sep. 29, 2006 (JP) ................. P2006-269778

(51) Int. Cl.
*G06F 7/04* (2006.01)

(52) U.S. Cl.
USPC ............................................. 726/6

(58) Field of Classification Search
USPC ............................................. 726/6
See application file for complete search history.

(56) References Cited

U.S. PATENT DOCUMENTS

2006/0277151 A1* 12/2006 Sankaran et al. ............... 705/59

FOREIGN PATENT DOCUMENTS

| JP | 2003050782 | 2/2003 |
|---|---|---|
| JP | 2005229178 | 8/2005 |
| WO | WO 2005076518 A1 * | 8/2005 |

OTHER PUBLICATIONS

Machine Translation of JP2003-050782.*
Menezes et al. (1996). Handbook of Applied Cryptography, pp. 321-383, 489-590.*
Duffield et al. (2005). Priority sampling estimating arbitrary subset sums, arXiv:cs.DS/0509026v1 Sep. 9, 2005. http://arxiv.org/PS_cache/cs/pdf/0509/0509026v1.pdf, 26 pages.*

* cited by examiner

*Primary Examiner* — Ashok Patel
*Assistant Examiner* — Brian Shaw
(74) *Attorney, Agent, or Firm* — Nixon & Vanderhye P.C.

(57) ABSTRACT

An authenticating device communicating with a server device includes: a dividing unit that divides secret information into plural secret fragments by a threshold secret sharing scheme; a first generating unit that generates plural cryptographic fragments by encrypting the secret fragments using first plural passwords; a first transmitting unit that transmits the cryptographic fragments to the server device; a first receiving unit that receives the cryptographic fragments from the server device, a second generating unit that generates plural secret fragment candidates by decrypting the cryptographic fragments using second plural passwords; a third generating unit that obtains a verifying information candidate by the threshold secret sharing scheme using a group of the secret fragment candidates; a second transmitting unit that transmits the verifying information candidate to the server device; and a second receiving unit that receives result information of comparing the verifying information candidate with verifying information in the server device.

20 Claims, 5 Drawing Sheets

USER AUTHENTICATION METHOD, USER AUTHENTICATING DEVICE AND PROGRAM PRODUCT

CROSS-REFERENCE TO RELATED APPLICATIONS

This application is based upon and claims the benefit of priority from Japanese Patent Application No. 2006-269778, filed Sep. 29, 2006, the entire contents of which are incorporated herein by reference.

BACKGROUND

1. Field

The present invention relates to a user authentication method, a user authentication device, and a program product.

2. Description of the Related Art

In accessing a resource such as a computer, or the like, a service, and the like, in some cases a user's privilege needs to be authenticated. For this purpose, various authenticating devices that specify a user individual or a group are known. Most of these devices are provided based on cryptographic technology, so that inevitably these devices are based upon a fact that an authenticated user (or group) alone possesses secret information that only the user can know. Normally the secret information is binary data that is long enough not to be guessed by an illegal user, and is not suitable for the human remembrance. Therefore, the secret information is stored in a hard disk of a computer, or a memory device such as an IC card, or the like. In order to enhance security, the secret information may be stored in combination with a password that the user can remember.

In this manner, when by any chance the user has lost the IC card in which the secret information is stored, or the secret information has been lost unexpectedly because of any trouble of the hard disk, or the user has forgotten the password used to encrypt the secret information, the authenticating device that is based upon the fact that the user possesses any secret information is not able to authenticate the user. As a result, it is necessary to give relief to the user by any approach.

Conventionally, such a method is widely utilized that the user registers a "secret password" in advance and then the user is caused to input the password in authenticating the user. For example, a mother's maiden name of the user, a name of the pet that the user keeps, or the like is registered in advance on the authenticating side as a "secret password" and, in authenticating the user, the user who guesses the "secret password" exactly is authorized.

However, a third person can guess the secret information easily or try several possibilities of the secret information repeatedly, or investigate the secret information by examining a family register of the user. Therefore, according to the above authentication method, it is never difficult for the third person to get illegally the authorization.

When the "secret password" is set to a very complicated meaningless password such that the third person cannot guess such password, such complicated password enhances the possibility that the user forgets it. Thus, such complicated password is not practical.

In order to prevent this problem, such a method may be considered that a lot of simple "secret passwords" that the user does not forget should be registered. In such case, a lot of "secret passwords" that only the user can know are disclosed for registering. Particularly, when such method is applied to the on-line service, a lot of "secret passwords" are disclosed to the authenticating side. This causes leakage of user's privacy information because the "secret password" often contains the user's privacy information.

In addition, when a plurality of on-line service providers (abbreviated as "sites" hereinafter) for making password recovery by such method (on the authenticating side) are set up, not only the problem that the user's privacy leaks out to here and there arises, but also the "secret password" is authenticated illegally at all sites that the user uses when the "secret password" has leaked from one site due to the server's cracking, the administrator's illegal action, or the like. Typically, when a site of an on-line game is cracked, money is drew out from the user's bank account as another site. Because of these circumstances, the user cannot register the own "secret password" without anxiety.

JP-A 11-215117 (KOKAI) discloses a method of preventing leakage of the "secret password". In this method, the secret information such as a mother's maiden name, or the like is encoded into a code, and then secret keys are encrypted by using the resultant code as a key. These encrypted secret keys are encrypted again by an asymmetric cryptosystem while using a public key of the authentication agent, and then the result is stored as a key recovering file. Thus, the user can restore the secret keys from the secret information such as a mother's maiden name, or the like even though the user lost the secret keys. This method possesses such an advantage that the secret keys can be restored without disclosing the secret information such as a mother's maiden name, or the like. However, the problem in which a third person can be authenticated illegally by guessing a simple "secret password" cannot be solved yet. In order not to allow the illegal key recovery, the reliable authentication agent that possesses the secret keys used in the asymmetric cryptosystem have to authenticate the user. Therefore, this system does not merely respond to the request such that the proper authenticating side (site) authenticates the user.

As described above, in the conventional user authentication method using the "secret password", it is fear that the secret password is easily guessed, the user has to memorize many secret passwords, leakage of the user's information is caused because the service provider has to be informed of the privacy information, a service provided from another site is accessed illegally based on the secret password leaked from a certain site, and the like.

SUMMARY

An aspect provides a user authentication method for authenticating a user at a first device communicating with a second device, including: when registering passwords, dividing a secret information into a plurality of secret fragments by a threshold secret sharing scheme in the first device, the secret information being shared with the second device in advance; generating a plurality of cryptographic fragments by encrypting the plurality of secret fragments using a first plurality of secret keys generated from a first plurality of passwords inputted by the user in the first device; transmitting the generated plurality of cryptographic fragments to the second device from the first device; receiving the transmitted plurality of cryptographic fragments at the second device; storing the received plurality of cryptographic fragments and the secret information; when authenticating the user, transmitting the stored plurality of cryptographic fragments to the first device form the second device; receiving the transmitted plurality of cryptographic fragments at the first device; generating a plurality of secret fragment candidates by decrypting the received plurality of cryptographic fragments using a second plurality of secret keys generate from a second plurality of passwords inputted by the user for authenticating; generating a secret information candidate by the threshold secret sharing scheme using a group of the generated plurality of secret fragment candidates; obtaining a verifying information candidate from the generated secret information candidate; transmitting the obtained verifying information candidate to the second device from the first device; receiving the transmitted verifying information candidate at the second device; and comparing the received verifying information candidate with verifying information stored in advance in the second device.

Another aspect provides an authenticating device that authenticates a user by communicating with a server device, including: a dividing unit that divides secret information into a plurality of secret fragments by a threshold secret sharing scheme; a first generating unit that generates a plurality of cryptographic fragments by encrypting the plurality of secret fragments using a first plurality of secret keys generated from a first plurality of passwords inputted by the user for registering; a first transmitting unit that transmits the plurality of cryptographic fragments generated by the first generating unit to the server device; a first receiving unit that receives the plurality of cryptographic fragments transmitted from the server device for authenticating the user; a second generating unit that generates a first plurality of secret fragment candidates by decrypting the plurality of cryptographic fragments received by the first receiving unit, using a second plurality of secret keys generated from a second plurality of passwords inputted by the user for authenticating; a third generating unit that generates a first secret information candidate by the threshold secret sharing scheme using a first group of the generated first plurality of secret fragment candidates and that obtains a first verifying information candidate from the generated first secret information candidate; a second transmitting unit that transmits the obtained first verifying information candidate to the server device; and a second receiving unit that receives result information of comparing the first verifying information candidate with verifying information stored in advance in the server device.

Still another aspect provides a computer program product for enable a computer to authenticate a user by communicating with a server device, including: software instructions for enabling the computer to perform predetermined operations, and a computer readable medium bearing the software instructions. The predetermined operations includes: dividing secret information into a plurality of secret fragments by a threshold secret sharing scheme; generating a plurality of cryptographic fragments by encrypting the plurality of secret fragments using a first plurality of secret keys generated from a first plurality of passwords inputted by the user; transmitting the generated plurality of cryptographic fragments to the server device; receiving the plurality of cryptographic fragments from the server device for authenticating the user; generating a plurality of secret fragment candidates by decrypting the received plurality of cryptographic fragments, using a second plurality of secret keys generated from a second plurality of passwords inputted by the user for authenticating; generating a secret information candidate by the threshold secret sharing scheme using a group of the generated plurality of secret fragment candidates; obtaining a verifying information candidate from the generated secret information candidate; transmitting the obtained verifying information candidate to the server device; and receiving result information of comparing the verifying information candidate with verifying information stored in the server device.

DETAILED DESCRIPTION

Embodiments according to the present invention will be explained in detail with reference to the drawings hereinafter.

Figure 1:
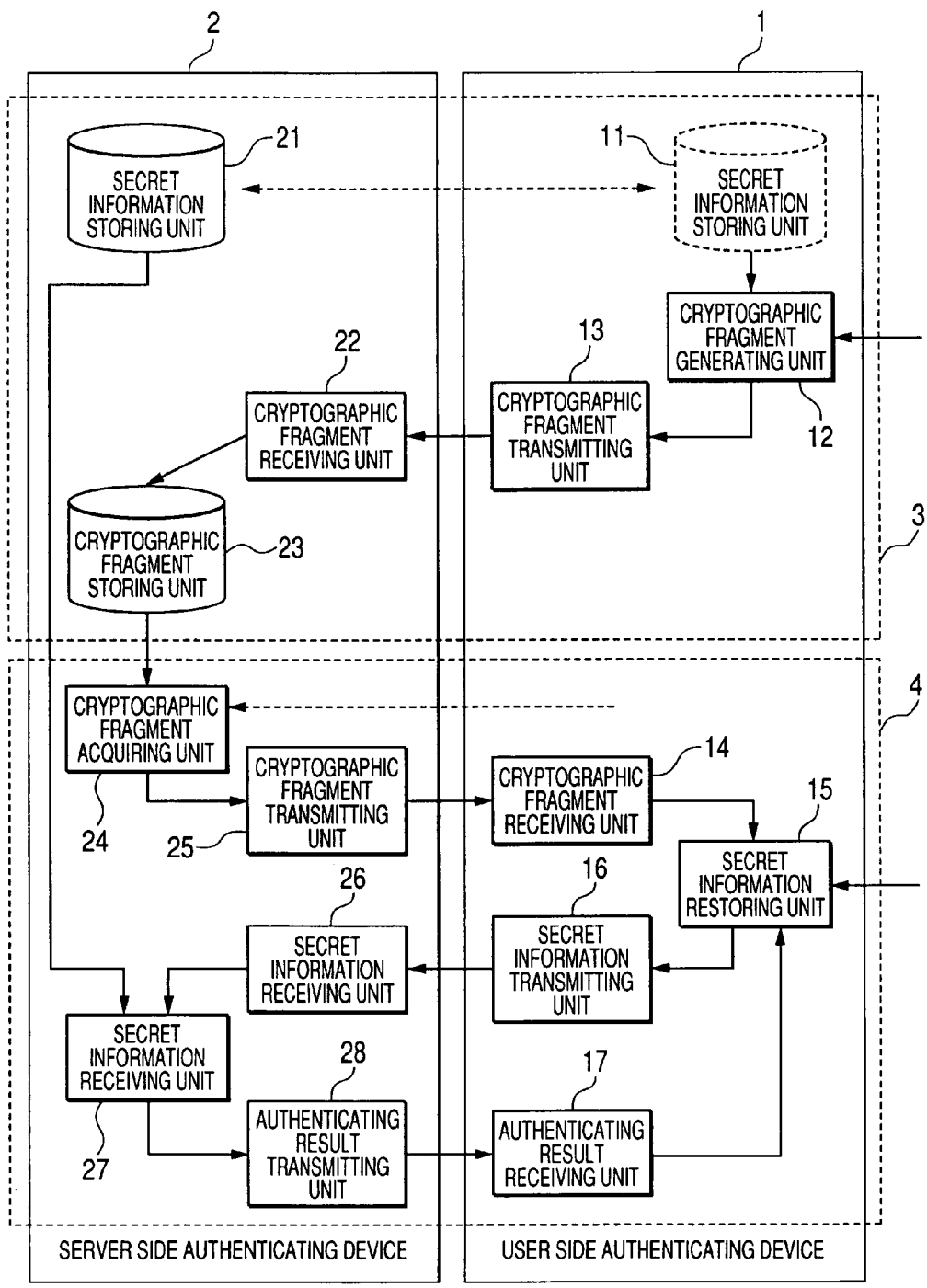
FIG. 1 is a view showing functional blocks of an overall system according to an embodiment.

According to the present system as shown in FIG. 1, a plurality of secret passwords input from the user are registered, and then the user is caused to input the plurality of secret passwords when a user's authentication is necessary. At that time, even though the user forgets several secret passwords or remembers the wrong secret passwords, this system authenticates the user correctly when the number of remaining secret passwords that are correct is more than a predetermined number. The "secret password" mentioned herein means the data that the people except for the user himself or herself are unable to know or are hard to know.

The present system includes a user side authenticating device (authenticating device) 1 and a server side authenticating device (server device) 2. When viewed functionally, this system includes a password registering unit 3 and a password verifying unit 4, which are operated when the user side authenticating device 1 and the server side authenticating device 2 cooperate with each other.

At first, a configuration of the password registering unit 3 will be explained hereunder.

A secret information storing unit 11 and a secret information storing unit 21 store secret information that are shared in advance among them by any method.

Here, the secret information is any value necessary for the authenticating operation and has a feature that another person cannot guess. For example, random numbers that are generated by a random number generator (not shown) to have no meaning at all may be employed. In order to enhance security, preferably this random numbers should be set as long as possible.

This secret information gives the secret that only the user side authenticating device 1 and the server side authenticating device 2 are able to know. For example, preferably the user side authenticating device 1 should share other secret information with another server side authenticating device (not shown). Similarly, preferably the user side authenticating device 1 should share other secret information with another user side authenticating device (not shown).

Also, it is assumed herein that the secret information is stored in advance in the secret information storing unit 11 and a secret information storing unit 21, but the present invention is not limited to this situation. The server side authenticating device 2 or the user side authenticating device 1 may generate secret information and then send it to the opposing system. In this case, a transmitting timing may be set to a point of time when the secret password is actually registered, or the secret information may be transmitted before the point of time. It is needless to say that not the device generates secret information by itself but the device may receive secret information generated by an external device and may utilize it.

Also, it is assumed herein that the same secret information is shared between the user side authenticating device 1 and the server side authenticating device 2. More properly, the secret information may be generated based upon the same origin. For example, when secret information in the user side authenticating device 1 has an enough length, the server side authenticating device 2 may possess only a part of the secret information (since a reliable coincidence can be confirmed). For example, the server side authenticating device 2 may possess a data converted from the secret information of the user side authenticating device 1 by a predetermined method. A latter example will be described later.

The secret information should be transmitted in such a way that the secret information is not intercepted by a third person by using an encrypted communication channel, or the like. As for the encrypted communication channel, the generally known technique such as Secure Socket Layer (SSL), or the like may be employed and thus particular explanation will not be made herein.

Figure 2:
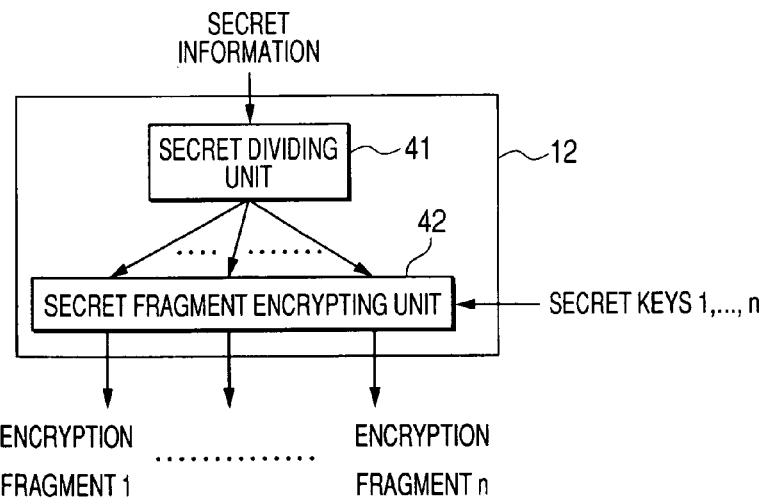
FIG. 2 is a functional block diagram of a cryptographic fragment generating unit.

A cryptographic fragment generating unit 12 receives the secret information and plural combinations (here, n combinations) of secret passwords and outputs plural pieces (here, n) of cryptographic fragments. A functional block diagram of the cryptographic fragment generating unit 12 is shown in FIG. 2, and will be explained in detail hereunder.

A secret dividing unit 41 receives the secret information from the secret information storing unit 11 and generates n pieces of cryptographic fragments by a threshold secret sharing scheme. That is, the secret dividing unit 41 divides the secret information into n pieces of cryptographic fragments by the threshold secret sharing scheme.

A threshold secret sharing scheme mentioned herein is called a (k, n) secret sharing scheme or a k-out-of-n sharing scheme. According to the threshold secret sharing scheme, original secret information can be restored from any k pieces of secret fragments (k<n) out of n pieces of secret fragments that is obtained from the original secret information. That is, the threshold secret sharing scheme is derived from the meaning that the original secret information can be restored when k pieces or more of secret fragments are known.

As a typical approach applied to implement the threshold secret sharing scheme, a Shamir approach using the polynomial (A. Shamir: How to Share a Secert, Communications of the ACM, Vol. 22, No. 11, pp. 612 to 613, 1979), a Blakley approach using the projective geometry (G. R. Blakley: Safeguarding Cryptographic Keys, Proc. Of AFIPS 1979 National Computer Conference, Vol. 48, pp. 313 to 317, 1979), and the like are known.

A way of the secret dividing unit 41 for generating n pieces of secret fragments from the secret information can be employed by using these publicly known threshold secret sharing schemes, for example. The secret dividing unit 41 is not limited particularly to these schemes. Generally any scheme, if belonging to the threshold secret sharing scheme, may be employed, and thus explanation of a dividing algorithm in the secret dividing unit 41 will be omitted in this specification. Also, explanation of the algorithm applied in restoring the secret information from a plurality of secret fragments, described later, will be omitted herein.

According to the threshold secret sharing scheme, combination of fragments serving as the output is not uniquely decided in response to particular input information. Since a random value can be used in the processing in the nature of the threshold secret sharing scheme, it is common to output a different combination of secret fragments each execution. Even though the output is uniquely decided in the secret dividing unit 41 or not, effectiveness of the present embodiment is never spoiled. But it is considered desirably that the security should be enhanced by using the system whose output is not uniquely decided. The system whose output is not uniquely decided can be implemented by the approach set forth in the above described publicly known literature.

Then, a secret fragment encrypting unit 42 in FIG. 2 receives n pieces of secret fragments generated by the secret dividing unit 41, and encrypts them by using n pieces of secret keys generated from n pieces of secret passwords externally inputted by the user's operation, respectively to generate n pieces of cryptographic fragments.

Then, a meaning of the secret key will be explained more concretely by taking an example hereunder. First, the user considers any secret. For example, assume that the fact "Nickname of my first love is Orangutan" is decided as one secret. The user himself or herself never forgets this secret with a considerably high probability. Of course, if everybody of user's friends know who is the user's first love, this secret is a bad example. The risk that the secret is broken is much more increased if this nickname is famous, and thus such nickname is not preferable. However, as a feature of the present embodiment, the security can be kept at such a level that, if by any chance anyone knows this secret, he or she cannot be authenticated illegally at once.

A strange secret may be considered on a basis of the consideration that the familiar secret like the "first love" is easily guessed by attackers. For example, a strange secret like "A collection of students" composition put in a time capsule in my elementary school days had been finished writing through the night" may be considered. This secret might be good if this secret would be user's important memory that the user never forgets, but it is likely that such secret is not always important. In the present embodiment, since any necessary numbers (k and n) of secrets can be set, a balance between security and convenience can be kept by setting the value k somewhat large, or the like even when individual secrets are not made extremely difficult. Therefore, this embodiment is of the merit that a level of secret (rememberability) does not become an issue.

Figure 3:
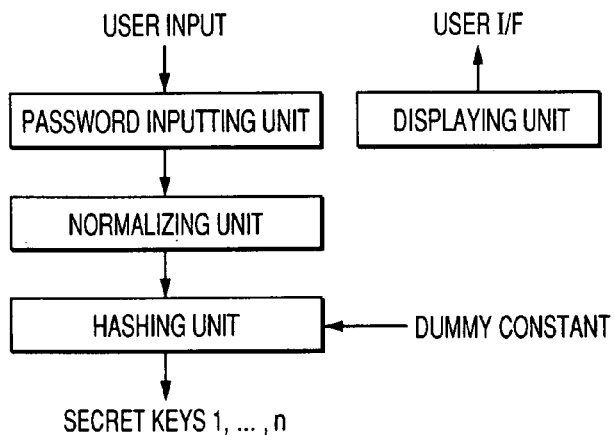
FIG. 3 is a functional block diagram of generating n secret keys.
Figure 4:
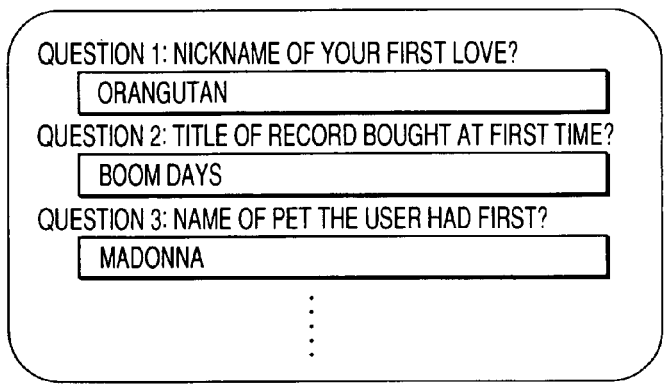
FIG. 4 is a view of an example of a user I/F.

A method of generating a secret key in the present embodiment will be explained hereunder. In this example, n pieces of secret questions are offered to the user via a user I/F as shown in FIG. 4, and then the user makes secret replies to these questions via an inputting unit and thus n pieces of secret passwords are input. As shown in FIG. 3, the n input passwords are normalized if necessary, and then the secret key is generated by hashing the passwords, to which dummy constants have been added, with a hash function. Here, the normalization means that, in deriving the secret key that is applied to encrypt the secret fragments based on the secret replies, the output is normalized by the transformation function that outputs the same value in response to similar meaning secret replies by the natural language processing For example, although the secret key was generated from the secret password of "Nickname of my first love was Orangutan" in registering the secret password, the user remembers the secret of "Nickname of first love of me was Orangutan" and inputs it simply in verifying the secret password. In this event, since a secret key different from the secret key in registering the secret password is generated, decryptographic fragments cannot be restored by using this secret key.

In such case, it may be preferable that a text of the secret password should be not hashed with the hash function, but the secret password should be divided into meaning elementary pieces such as "first love", "Nickname" and "Orangutan" and then hashing these elementary pieces with the hash function. In addition, it may be considered that the normalization can be made more certain by rearranging these elementary pieces in alphabetic order such as "first love", "Nickname" and "Orangutan". Further, the normalization can be made to output same value if the "byname" similar to "nickname" is input. The technique of abstracting in the natural language processing, which is commonly known, may be applied to these normalizing methods, and its detailed explanation will be omitted in this specification.

It is an option that the dummy constant is added to the input to the hashing unit, and the dummy constant may be neglected.

Figure 5:
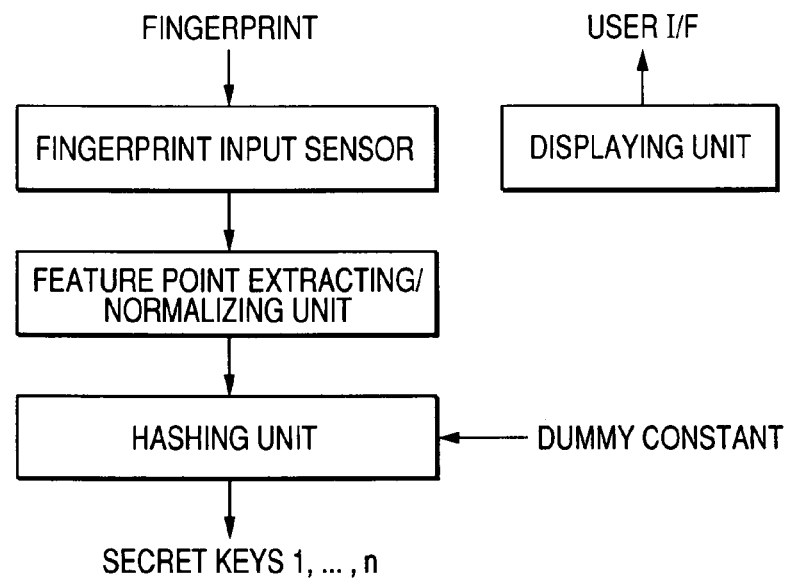
FIG. 5 is a functional block diagram of generating a secret key based on the fingerprint authentication.

In addition, a part or all of the generation of n pieces of secret keys may be implemented by biometric information such as fingerprint authentication as shown in FIG. 5. When the user puts the user's finger on a fingerprint input sensor to input fingerprint data, feature points are extracted by using the technology of the common fingerprint authentication known in the prior art and then the same value is output from the particular finger by normalizing the data. A secret key is generated by passing the normalized data through the hashing unit. The hashing is applied for the purpose of security, and the hashing unit may be neglected.

Similarly, the secret key generating method can be considered variously. For example, the six digits number that a user memorizes may be used as a pin number, or a random number generated by a random number generator is stored in a memory device such as a memory card and is used.

In the case of the secret key generating method according to the present embodiment, respective passwords can have their order to input the secret password into a predetermined section. Each password (and each secret key) and secret fragments have the correlation with each other. The secret key is generated by transforming the input secret reply (password), but the password itself may be employed as the secret key.

Either the same encrypting algorithm or different encrypting algorithms maybe employed in respective encrypting processes of the secret fragments in the secret fragment encrypting unit 42. Preferably use of the algorithms in the latter case should be limited to a system having configuration in which the correlation between the cryptographic fragments and the cryptographic algorithm is held. The wording "the correlation is held" means that, for example, the secret key is generated from the secret reply to the secret question in the system in which the secret questions offered to the user to input the password are widely disclosed and their orders are decided. In such case, since it does not become unclear by which encrypting algorithm n pieces of cryptographic fragments were encrypted respectively, no trouble is caused. Otherwise, when it is known that a certain number corresponds to the secret key generating method, inevitably no problem arises in different encrypting algorithms. For example, in the system where a rule that the 5-th cryptographic fragment is generated while employing the data being produced from the fingerprint input of the index finger of the right hand as the secret password as the secret key is set down, no particular problem arose on a system configuration even when the encrypting algorithm is either same or different as encrypting algorithms used to encrypt other fragments.

In the present embodiment, the description is given on the assumption that all or most of n pieces of secret keys used in encrypting the secret fragments are generated based on the user's memory. Of course, a gist of the present embodiment is not spoiled even though the secret key of a different nature is employed as a part of n pieces of secret keys.

The secret fragment encrypting unit 42 outputs n pieces of cryptographic fragments generated as described above.

Returning to FIG. 1, a cryptographic fragment transmitting unit 13 transmits all n pieces of cryptographic fragments from the secret fragment encrypting unit 42 of the cryptographic fragment generating unit 12 to the server side authenticating device 2. Preferably an encrypted communication channel should be employed in this transmission However, the transmission is not limited to this method.

A cryptographic fragment receiving unit 22 receives all cryptographic fragments transmitted from the cryptographic fragment transmitting unit 13 of the user side authenticating device 1.

A cryptographic fragment storing unit 23 stores all cryptographic fragments received by the cryptographic fragment receiving unit 22. In order to simplify an explanation, the description is given on the assumption that n pieces of cryptographic fragments are similarly processed and transmitted, and stored in the single memory device. Of course, such a mode is easily supposed by those skilled in the art that a part of cryptographic fragments should be stored in another memory device (e.g., another server device, a removable disk, or the like that the user manages separately, a backup device that the server manager manages separately, and the like), and therefore the separate explanation will be omitted herein.

The secret password registering unit 3 is configured as described above, and a set of secret passwords from the user can be registered such that the secret passwords are not disclosed to the server side authenticating device 2

In the server side authenticating device 2, all of plural cryptographic fragments stored in the cryptographic fragment storing unit 23 have to be stored at least until the passwords are verified by the password verifying unit 4. In contrast, in the user side authenticating device 1, there is no need to store the secret information and plural cryptographic fragments after the transmission of plural cryptographic fragments is completed. If the secret information and the secret password (secret key) are stored in a memory area, to which only the user can access, in the user side authenticating device, a configuration of this present embodiment is not needed originally. Even though the secret information and the secret passwords (secret keys) are lost, the system according to the present embodiment has a configuration that can recover such secret information and such secret passwords under particular conditions. But the present embodiment would not exclude the case where the secret information is left unexpectedly.

Next, a configuration of the password verifying unit 4 will be explained hereunder.

A cryptographic fragment acquiring unit 24 reads all cryptographic fragments from the user side authenticating device 1 stored in the cryptographic fragment storing unit 23. The cryptographic fragment acquiring unit 24 may start a reading operation when the server side authenticating device 2 provides actively any service, or may start a reading operation in response to a request signal issued from the user side authenticating device 1 (as shown in FIG. 1 by a dotted line arrow to the cryptographic fragment acquiring unit 24) For example, when the particular user's name is transmitted from the user side authenticating device 1 to the server side authenticating device 2, the server side authenticating device 2 may transmit the cryptographic fragments about the user corresponding to the user's name to the user side authenticating device 1.

A cryptographic fragment transmitting unit 25 transmits all cryptographic fragments read by the cryptographic fragment acquiring unit 24 to the user side authenticating device 1. As in the explanation of the cryptographic fragment transmitting unit 13, preferably an encrypted communication channel should be employed in this transmission, but the transmission should not always be limited to this mode.

A cryptographic fragment receiving unit 14 receives all cryptographic fragments that are transmitted.

A secret information restoring unit 15 receives all cryptographic fragments received by the cryptographic fragment receiving unit 14 and receives a set of passwords input by the user's operation, and tries to restore the secret information based on these inputs and outputs the restored result.

Figure 6:
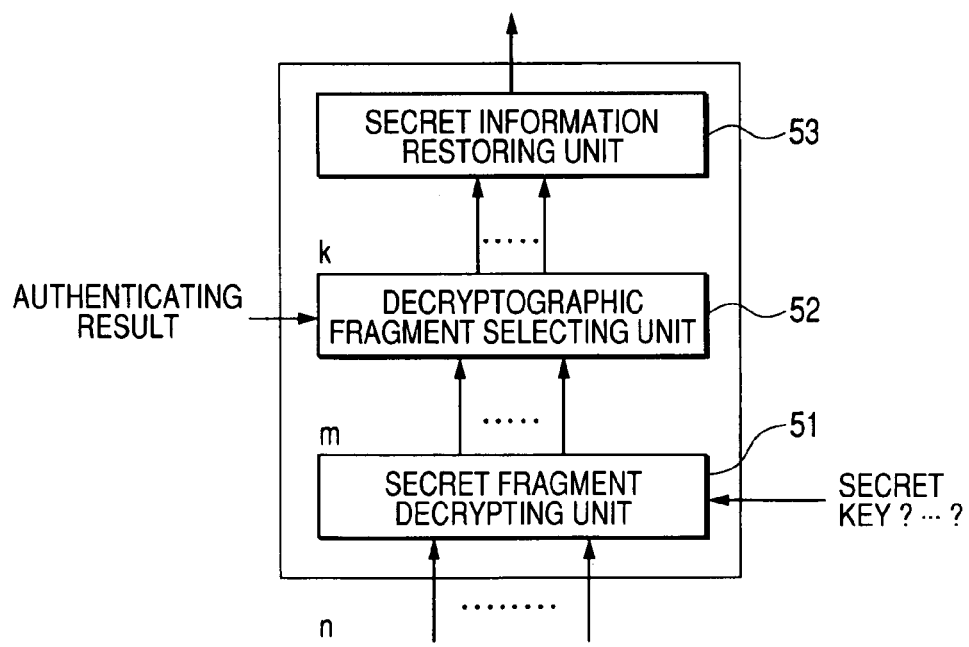
FIG. 6 is a functional block diagram of a secret information restoring unit.

A functional block diagram of the secret information restoring unit 15 is shown in FIG. 6, and will be explained in detail hereunder.

A secret fragment decrypting unit 51 decrypts n pieces of cryptographic fragment received by the cryptographic fragment receiving unit 14 by using the secret keys based on a set of passwords input by the user's operation. The passwords may be input by the similar method as the secret fragment encrypting unit 42 as explained above. Unlike the registering process, it is supposed that at this authenticating process, several passwords in a set of passwords input by the user's operation are not input yet because of user's failure of memory or input erroneously because of user's misunderstanding, or the like.

Therefore, the secret fragment decrypting unit 51 decrypts only cryptographic fragments, which have the corresponding secret keys generated, out of n pieces of cryptographic fragment, and then outputs respective decrypted results (referred to as "decryptographic fragments" hereinafter). It should be taken into account that outputted decryptographic fragments (suppose m, where m is a positive integer less than n) except for the fragments whose passwords are not input may include decryptographic fragments different from those to be generated properly when some passwords are wrong. Hence, a decryptographic fragment selecting unit 52 selects k pieces from generated decryptographic fragments. This k is equal to k that has already appeared in the recitation of the threshold secret sharing scheme explained previously, and is the number that is required to restore the original information (=secret information) from the secret fragments (=decryptographic fragments). Here, when a total number m of decryptographic fragments is below k, it is unfeasible to restore the secret information. In this case, the process of the password verifying unit 4 ends.

A secret information restoring unit 53 receives k pieces of decryptographic fragments selected by the decryptographic fragment selecting unit 52, and performs restoring operation by the threshold secret sharing scheme explained previously. The restored result restored by the secret information restoring unit 53 in this manner is output.

Returning to FIG. 1, a secret information transmitting unit 16 regards the restored result restored by the secret information restoring unit 15 (this is referred to as "secret information candidate" hereinafter) as the secret information, and transmits the secret information candidate to the server side authenticating device 2. A secret information receiving unit 26 receives the secret information candidate.

A secret information receiving unit 27 receives the secret information candidate received by the secret information receiving unit 26 and the secret information stored in the secret information storing unit 21 during the process in the password registering unit 3, and compares both input data. Then, the secret information receiving unit 27 outputs an authenticating result indicating that the secret information candidate is correct when both input data coincide with each other, while it outputs an authenticating result indicating that the secret information candidate is wrong when both input data do not coincide with each other. An authenticating result transmitting unit 28 transmits the authenticating result of the secret information receiving unit 27.

When the authenticating result transmitted from the authenticating result transmitting unit 28 indicates that the secret information candidate is wrong, an authenticating result receiving unit 17 transmits the authenticating result to the decryptographic fragment selecting unit 52 of the secret information restoring unit 15. The decryptographic fragment selecting unit 52 selects a group of k pieces of decryptographic fragments, which have not been authenticated yet, from m pieces and then the secret information restoring unit 53 restores once again a secret information candidate. That is, even when the password verifying unit 4 fails the verification, it checks repeatedly whether or not the correct secret information can be generated based on other combinations of decryptographic fragments. The password verifying unit 4 continues the authentication until the authenticating result indicating that both input data coincide with each other is obtained or all group of k pieces has been used for the authentication When the authenticating result transmitted from the authenticating result transmitting unit 28 indicates that a secret information candidate is correct, the authenticating result receiving unit 17 decides that the secret information is used by a proper user.

The password verifying unit 4 is configured as described above.

In the above explanation, the restored secret information is generated each time and authenticated. However, of course the user side authenticating device 1 may generate all secret information candidates from all combinations of k pieces of decryptographic fragments and then transmit collectively them to the server side authenticating device 2, and then the server side authenticating device 2 may authenticate these secret information candidates one by one.

The security of the system according to the present embodiment as described above will be explained hereunder The term "security" means that it is difficult for an attacker who gets plural cryptographic fragments stored in the server side authenticating device 2 (an illegal user who tries to conduct spoofing) to guess the secret information (in the above example, secret random number) that the server side verification system stores therein by some method and the attacker cannot know essentially.

According to the present embodiment, in order to restore the secret information from the cryptographic fragments, the user has to know the secret keys used in the encryption of the secret fragments. Since the system according to the embodiment is made on the assumption that the secret key never leaks, it becomes an issue when "secret passwords" as basis to guess the secret key is derived.

However, according to the present embodiment, if the attacker guesses the "secret passwords" only in one or some pieces smaller than k, respective secret fragments that are restored correctly in one or some pieces smaller than k are utterly meaningless random values for the attacker. Therefore, the attacker cannot understand whether or not the secret fragments are correct individually. As a result, the attacker cannot understand whether or not he or she guesses the "secret passwords (secret keys)". That is, an attack wherein the attacker guesses secret passwords individually and repeats it continuously is not applicable, i.e., the attack is not applicable unless k pieces of secret passwords are guessed at the same time, so that it is possible to say that the security is very high.

In contrast, in the system that the user cannot generate the key unless the user knows simply all n pieces of secret passwords, certainly the attack becomes difficult. However, the proper user cannot be authenticated when the user does not remember at least one of secret passwords, and therefore this system lacks practicality. On the contrary, according to the present embodiment, the user can be authenticated even when the user cannot remember some pieces of the secret passwords. Thus, it is possible to say that this system is of practical use.

Further, since the secret passwords as privacy information are handled only by the user side authenticating device 1, the system according to the present embodiment possesses such an advantage that privacy information are not disclosed to the server side authenticating device 2.

As described above, the authentication system according to the present embodiment has high security and availability and deals with the leakage prevention of privacy information, by utilizing the threshold secret sharing scheme cleverly.

Next, several modifications of the present embodiment will be explained hereunder.

Figure 7A:
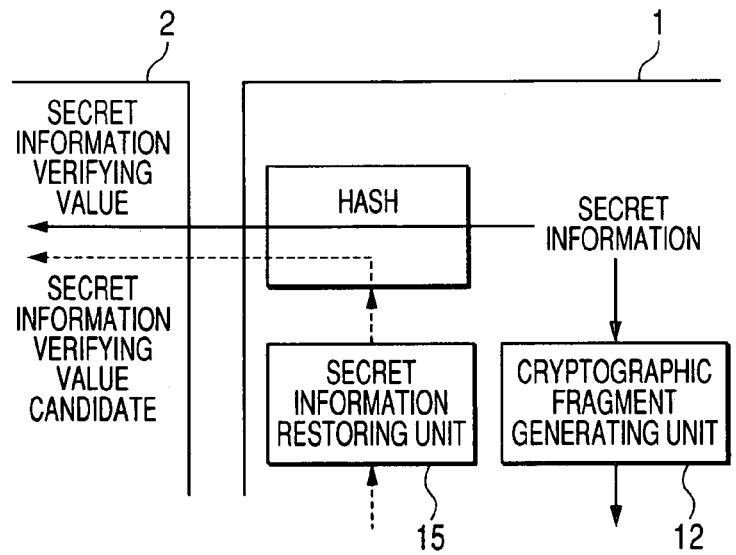
FIG. 7A is a functional block diagram showing a modified example 1 to generate the secret key.

As shown in FIG. 7A, according to a modified example 1, at a time of registering passwords, the secret information is input into the cryptographic fragment generating unit 12 as it is. On the other hand, the sever side authenticating device 2 sores secret information verification values as a result obtained by hashing the secret information with a hash function (one-way function). At a time of verifying the passwords, the secret information candidate generated by the secret information restoring unit 15 and hashed with the hash function is provided to the server side authenticating device 2 as a secret information verification value candidate.

Comparing with the above embodiment, the system according to this modified example 1 can delete the presence of the secret information itself from the server side authenticating device 2 when the registering process ends, and thus can enhance the security.

Figure 7B:
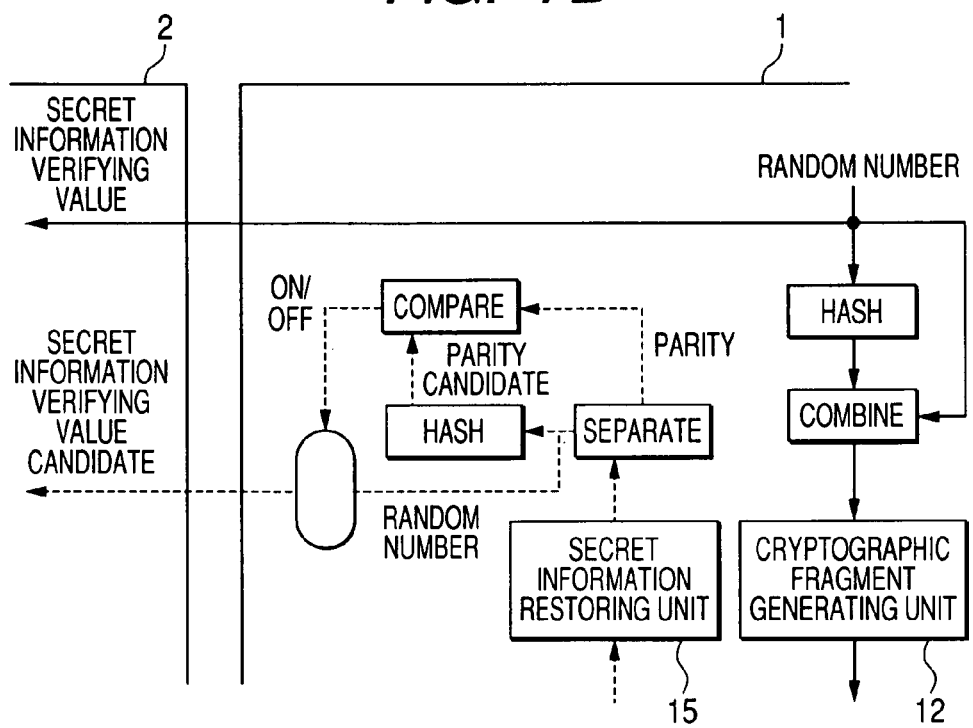
FIG. 7B is a functional block diagram showing a modified example 2 to generate the secret key.
Figure 8:
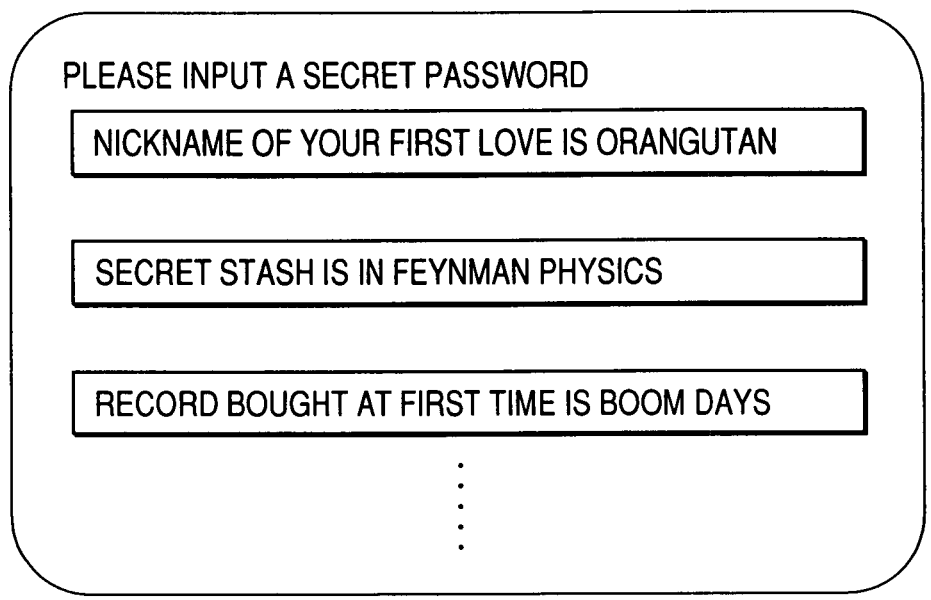
FIG. 8 is a view of an example of the user I/F when no order is given to the secret keys.

According to a modified example 2 as shown in FIG. 7B, at a time of registering, secret information including a random number and a verification parity to which the random number is hashed are linked together are input into the cryptographic fragment generating unit 12. The server side authenticating device 2 stores the random numbers. At a time of authenticating, a secret information candidate generated by the secret information restoring unit 15 is separated into a random number candidate and a verification parity candidate. Then the random number candidate is hashed and the verification parity candidate is compared with the hashed random number candidate to decide whether or not they coincide with each other When they coincide with each other, the random number candidate is provided to the server side authenticating device 2. Comparing to the above embodiment, the authenticating system according to this modified example 2 transmits the random number candidate contained in the secret information candidate to the server side authenticating device 2 only when it is likely based on the verification parity candidate that the secret information candidate correspond to the secret information. Therefore, the transmission of the random number candidate is reduced and thus a speedup of the user's authentication can be expected.

Next, a modified example regarding the restoration/authentication of the secret key will be explained hereunder.

In the above embodiment, the secret keys have a predetermined order, but the case where they have no order may be considered as follows. In this example, the questions previously prepared are not displayed. The question and the reply are freely input by the user. The secret keys are generated from the free reply sentence input by the user to the question by the similar configuration to the present embodiment explained above. In this case, generally it is difficult to input the secret passwords at a time of restoration in order of n pieces of secret keys at a time of registration.

Therefore, the above embodiment may be modified in such a way that the order of respective generated secret keys may set indefinitely but the cryptographic fragments may be decrypted while changing combination of respective decryptographic fragments that are subjected to the decrypting process by using the secret keys. Concretely, in case any m pieces are selected from n pieces of cryptographic fragments and then all combinations of m pieces of secret keys (calculated from m pieces of secret passwords) are tried, the user can succeed in the authentication when such user remembers k pieces or more of secret keys.

For example, when n=6 and m=4, the combinations are given as $6 \times 5 \times 4 \times 3 = 360$ and then the correct secret information is always contained in the secret information candidates of 360 ways. Here, it seems that this example needs 360 times a computational complexity according to this embodiment explained above. In fact, the combination for the correct information candidate, i.e., the combinations in which k pieces or more out of m pieces are arranged in correct positions are given as $12 \times 7 + 4 \times 2 + 1 = 93$ times when k=2 is selected, for example. As a result, if the configuration that repeats the authentication until the correct authenticating result is obtained at the server side authenticating device 2 is employed, the system according to this example needs only about 4 times in a calculation amount. Also, as another example, when all secret information candidates of 360 ways are prepared on the user side authenticating device 1 and then the secret information candidates are transmitted to the server side authenticating device 2, the system according to the example needs 360 times in a calculation amount. The secret information candidates having a higher frequency of occurrence are transmitted preferentially to the server side authenticating device 2. At that time, since the probability that the secret information candidate transmitted at first is verified correctly is high, the number of times the secret information candidates are transmitted to the server side authenticating device 2 is reduced to only once or several times, and thus the transmitting operation becomes effective. These configurations may be set appropriately according to an amount of information handled in the user's authentication or the application.

Actually, when p is smaller than k in the practical system, an attempt to increase a value p by demanding a correction of the secret password from the user, calling upon the user to remember another secret password additionally, or the like may be made.

In the above explanation, this modified example is made on the assumption that m is equal to or smaller than n, but the case where m is larger than n. Namely, n pieces of secret passwords are input in registering them, but the user may guess upon the secret passwords in larger number than n pieces when trying to remember the secret passwords. In such case, all combinations of m pieces of secret keys that the user can guess from n pieces of cryptographic fragments may also be tried. Thus, the difficulty in the process does not particularly arise.

According to this modified example, since the user inputs freely the secret password, it becomes more difficult to guess the secret password than the question format in the present embodiment explained as above. As a result, although a calculation amount is increased, it is difficult for the illegal user to conduct spoofing and the security is enhanced.

Also, as the secret password used in this modified example, plural pieces of same secret passwords may be registered. The user can have weighted plural secret passwords. That is, if the secret password that is easy to remember only for the user is registered plural times, the user can easily input such secret password plural times at an authenticating time and the user's authenticating input is simplified. In this case, when such a design specification is applied that the secret key based upon the password being input plural time is used preferentially to decrypt the cryptographic fragments, the probability that the correct authenticating result is quickly obtained becomes high and also a speedup of the authenticating process is expected.

It is of course that the present embodiment and respective modified examples explained in detail as above may be employed in combination appropriately according to the application of the authenticating system.

Also, the user authentication methods in the present embodiment and respective modified examples may be suitable particularly for the password recovery method, which is supposed to be used rarely, rather than systems that are used always in the user authentication. The reason for this is that a possibility that the user remembers all passwords though such user remembers several passwords is low because the user rarely uses such systems and that the security has to be ensured.

Also, it is of course that the user side authenticating device 1 and the server side authenticating device 2 explained in the above may be configured by the ordinary computer and a part or all of respective configurations in the user side authenticating device 1 and the server side authenticating device 2 may be configured by software programs that are run on the computer.

We claim:

1. A user authentication method for authenticating a user at a first device communicating with a second device, the method comprising:
when registering passwords,
dividing secret information into a plurality of secret fragments by a threshold secret sharing scheme in the first device, the secret information being shared with the second device in advance;
generating a plurality of cryptographic fragments by encrypting the plurality of secret fragments using a first plurality of secret keys that are uniquely and respectively set for each of the secret fragments, the secret keys being respectively generated from a first plurality of user passwords; and
transmitting the generated plurality of cryptographic fragments from the first device to the second device for storage;
when authenticating the user,
receiving at the first device the plurality of cryptographic fragments transmitted from the second device;
generating a plurality of secret fragment candidates by decrypting the received plurality of cryptographic fragments using a second plurality of secret keys generated from a second plurality of user passwords;
generating a secret information candidate by the threshold secret sharing scheme using a group of the generated plurality of secret fragment candidates, the threshold secret sharing scheme based on a threshold number of user passwords;
obtaining a verifying information candidate from the generated secret information candidate;
transmitting the obtained verifying information candidate from the first device to the second device for comparison with verifying information stored in advance in the second device; and
successfully decrypting the secret information when a number of the plurality of secret fragment candidates exceeds the threshold number in the threshold secret sharing scheme.

2. An authenticating device that authenticates a user by communicating with a server device, the authenticating device comprising:
a dividing unit that divides secret information into a plurality of secret fragments by a threshold secret sharing scheme;
a first generating unit that generates a plurality of cryptographic fragments by encrypting the plurality of secret fragments using a first plurality of secret keys that are uniquely and respectively set for each of the secret fragments, the secret keys being respectively generated from a first plurality of user passwords;
a transmitting unit that transmits the plurality of cryptographic fragments generated by the first generating unit to the server device;
a receiving unit that receives the plurality of cryptographic fragments transmitted from the server device for authenticating the user;
a second generating unit that generates a first plurality of secret fragment candidates by decrypting the plurality of cryptographic fragments received by the first receiving unit, using a second plurality of secret keys generated from a second plurality of user passwords; and
a third generating unit that generates a first secret information candidate by the threshold secret sharing scheme using a first group of the generated first plurality of secret fragment candidates and that obtains a first verifying information candidate from the generated first secret information candidate, the threshold secret sharing scheme based on a threshold number of user passwords, wherein
the transmitting unit transmits the obtained first verifying information candidate to the server device;
the receiving unit receives result information of comparing the first verifying information candidate with verifying information stored in advance in the server device; and
the secret information is successfully decrypted when a number of the plurality of secret fragment candidates exceeds the threshold number in the threshold secret sharing scheme.

3. The authenticating device according to claim 2, wherein the verifying information is the secret information and the first verifying information candidate is the first secret information candidate.

4. The authenticating device according to claim 2, wherein the verifying information is obtained by hashing the secret information with a hash function and the first verifying information candidate is obtained by hashing the first secret information candidate with the hash function.

5. The authenticating device according to claim 2, wherein the verifying information is a part of the secret information and the first verifying information candidate is a part of the first secret information candidate corresponding to the part of the secret information.

6. The authenticating device according to claim 2,
wherein, when the receiving unit receives result information indicating that the first verifying information candidate does not coincide with the verifying information, the third generating unit generates a second secret information candidate using a second group of the first plurality of secret fragment candidates and obtains a second verifying information candidate from the generated second secret information candidate, and
wherein the first group includes at least one secret fragment candidate that is not included in the second group.

7. The authenticating device according to claim 2,
wherein, when the receiving unit receives result information indicating that the first verifying information candidate does not coincide with the verifying information, the second generating unit generates a second plurality of secret fragment candidates by changing a combination of the plurality of cryptographic fragments and the second plurality of secret keys, and
wherein the third generating unit generates a second secret information candidate by a second group of the generated second plurality of secret fragment candidates, and obtains a second verifying information candidate from the generated second verifying information candidate.

8. The authenticating device according to claim 2,
wherein the second generating unit generates a plurality of sets of a plurality of secret fragment candidates by changing a combination of the plurality of cryptographic fragments and the second plurality of secret keys,
wherein the third generating unit generates a plurality of secret information candidates by the threshold secret sharing scheme from each of the sets of the plurality of secret fragment candidates using a plurality of groups of the plurality of secret fragment candidates of each set, and
wherein the third generating unit obtains each one of a plurality of verifying information candidates from a respective one of the plurality of secret information candidates.

9. The authenticating device according to claim 8,
wherein the transmitting unit transmits all of the generated plurality of verifying information candidates.

10. The authenticating device according to claim 8,
wherein the transmitting unit preferentially transmits a third verifying information candidate having higher frequency of occurrence among all of the generated plurality of verifying information candidates.

11. The authenticating device according to claim 2,
wherein the secret information includes a random number and the verifying information, which is generated from the random number,
wherein the third generating unit divides the generated first secret information candidate into first information corresponding to the verifying information and second information corresponding to the random number,
wherein the third generating unit determines whether the first information is generated from the second information, and
wherein the third generating unit employs the first information as the first verifying information candidate when it is determined that the first information is generated from the second information.

12. The authenticating device according to claim 2,
wherein each of the first and second plurality of secret keys are data obtained by applying a transformation function to the first and second user passwords as replies to a plurality of questions.

13. The authenticating device according to claim 12,
wherein the transformation function outputs the same value in response to the similar meaning user passwords as inputs by a natural language processing.

14. A non-transitory computer readable medium comprising software instructions which, when executed, perform steps to enable a computer to authenticate a user by communicating with a server device, the steps comprising:
dividing secret information into a plurality of secret fragments by a threshold secret sharing scheme;
generating a plurality of cryptographic fragments by encrypting the plurality of secret fragments using a first plurality of secret keys that are uniquely and respectively set for each of the secret fragments, the secret keys being respectively generated from a first plurality of user passwords;
transmitting the generated plurality of cryptographic fragments to the server device for storage;
receiving the plurality of cryptographic fragments from the server device for authenticating the user;
generating a plurality of secret fragment candidates by decrypting the received plurality of cryptographic fragments, using a second plurality of secret keys generated from a second plurality of user passwords;
generating a secret information candidate by the threshold secret sharing scheme using a group of the generated plurality of secret fragment candidates, the threshold secret sharing scheme based on a threshold number of user passwords;
obtaining a verifying information candidate from the generated secret information candidate;
transmitting the obtained verifying information candidate to the server device;
receiving result information of comparing the verifying information candidate with verifying information stored in the server device; and
successfully decrypting the secret information when a number of the plurality of secret fragment candidates exceeds the threshold umber in the threshold secret sharing scheme.

15. The method according to claim 1, wherein the first plurality of secret keys is generated from a first plurality of user passwords supplied by one user.

16. The method according to claim 15, wherein the second plurality of secret keys is generated from a second plurality of user passwords supplied by the same one user.

17. The method according to claim 1, further comprising:
normalizing the first plurality of user passwords.

18. The method according to claim 1, wherein the encrypting of the plurality of secret fragments uses two or more different algorithms.

19. The method according to claim 1, the generating of the first plurality of secret keys comprises hashing the first plurality of user passwords with a hash function.

20. The authenticating device according to claim 2, wherein the first plurality of secret keys are generated by hashing the first plurality of user passwords with a hash function.

* * * * *